(12) United States Patent
Tarumi et al.

(10) Patent No.: US 6,287,648 B1
(45) Date of Patent: Sep. 11, 2001

(54) LIQUID-CRYSTALLINE MEDIUM

(75) Inventors: Kazuaki Tarumi, Seeheim; Peer Kirsch; Sabine Schoen, both of Darmstadt; Dagmar Klement, Münster, all of (DE)

(73) Assignee: Merck Patent Gesellschaft Mit (DE)

( * ) Notice: Subject to any disclaimer, the term of this patent is extended or adjusted under 35 U.S.C. 154(b) by 0 days.

(21) Appl. No.: 09/468,846

(22) Filed: Dec. 22, 1999

(30) Foreign Application Priority Data

Dec. 22, 1998 (DE) .............................. 198 59 419
Mar. 10, 1999 (DE) .............................. 199 10 435

(51) Int. Cl.[7] .............................. C09K 19/30; C09K 19/12
(52) U.S. Cl. ................. 428/1.1; 252/299.63; 252/299.66
(58) Field of Search ......................... 252/299.63, 299.66; 428/1.1

(56) References Cited

FOREIGN PATENT DOCUMENTS

4015681 * 11/1991 (DE) .

OTHER PUBLICATIONS

Patent Abstract of DE–4015681, 1991.*

* cited by examiner

Primary Examiner—Shean C. Wu

(74) Attorney, Agent, or Firm—Millen, White, Zelano & Branigan, P.C.

(57) ABSTRACT

The invention relates to a liquid-crystalline medium based on a mixture of polar compounds of positive dielectric anisotropy, containing at least one compound of the general formula I

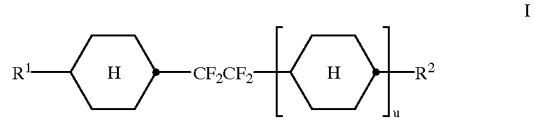

in which $R^1$ and $R^2$ are each, independently of one another, an alkyl or alkenyl radical having 1 to 12 carbon atoms which is unsubstituted, monosubstituted by CN or $CF_3$ or at least monosubstituted by halogen, where one or more $CH_2$ groups in these radicals may also, in each case independently of one another, be replaced by —O—, —S—,

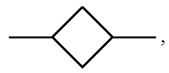

—CO—, —CO—O—, —O—CO— or —O—CO—O— in such a way that O atoms are not linked directly to one another and u is 1 or 2.

20 Claims, No Drawings

LIQUID-CRYSTALLINE MEDIUM

The present invention relates to a liquid-crystalline medium, and to the use thereof for electro-optical purposes, and to displays containing this medium.

Liquid-crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, quest/host cells, TN cells having a twisted nematic structure, STN (supertwisted nemantic) cells, SBE (superbirefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, in the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, must satisfy various requirements depending on the cell type and area of application. For example, materials for cells having a twisted nematic structure should have positive dielectric anisotropy and low electrical conductivity.

For example, media having large positive dielectric anisotropy, broad nematic phases, relatively low birefringence, very high specific resistance, good UV and temperature stability and low vapour pressure are desired for matrix liquid-crystal displays containing integrated non-linear elements for switching individual pixels (MLC displays).

Matrix liquid-crystal displays of this type are known. Non-linear elements which can be used for individual switching of the individual pixels are, for example, active elements (i.e. transistors). Reference is then made to an "active matrix", where a distinction can be made between two types:

1. MOS (metal oxide semiconductor) or other diodes on a silicon wafer as substrate.
2. Thin-film transistors (TFTs) on a glass plate as substrate.

The use of monocrystalline silicon as substrate material restricts the display size, since even modular assembly of various part-displays results in problems at the joints.

In the case of more-promising type 2, which is preferred, the electro-optical effect used is usually the TN effect. A distinction is made between two technologies: TFTs comprising compound semiconductors, such as, for example, CdSe or TFTs based on polycrystalline or amorphous silicon.

The TFT matrix is applied to the inside of one glass plate of the display, while the other glass plate carries the transparent counterelectrode on its inside. In contrast to the size of the pixel electrode, the TFT is very small and has virtually no interfering effect on the image. This technology can also be expanded to fully colour-compatible displays, in which a mosaic of red, green and blue filters is arranged in such a way that a filter element is opposite each switchable pixel.

The TFT displays usually operate as TN cells with crossed polarizers in transmission and are illuminated from the back.

The term MLC displays here covers any matrix display containing integrated non-liner elements, i.e., besides the active matrix, also displays containing passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to the insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SCHIMIZU, H., Proc. Eurodisplay 84, September 1984: A 210–288 Matrix LCD Controlled by Double Stage Diode Rings, p. 141 ff, Paris: STROMER, M., Proc. Eurodisplay 84, September 1984: Design of Thin Film Transistors for Matrix Addressing of Television Liquid Crystal Displays, p. 145 ff, Paris]. With decreasing resistance, the contrast of a MLC display worsens, and the problem of after-image elimination can occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures of the prior art are also particularly disadvantageous. The demands are that no crystallization and/or smectic phases occur, even at low temperatures, and the temperature dependence of the viscosity is as low as possible. The MLC displays from the prior art thus do not meet today's requirements.

There thus continues to be a great demand for MLC displays having very high specific resistance at the same time as a large working-temperature range, short response times even at low temperatures and low threshold voltage which do not have these disadvantages, or only do so to a reduced extent.

In TN (Schadt-Helfrich) cells, media are desired which facilitate the following advantages in the cells:

expanded nematic phase range (in particular down to low temperatures)

rapid switching at extremely low temperatures (outdoor use, automobile, avionics)

increased resistance to UV radiation (longer life)

The media available from the prior art do not allow these advantages to be achieved while simultaneously achieving the other parameters.

In the case of supertwisted (STN) cells, media are desired which enable greater multiplexability and/or lower threshold voltages and/or broader nematic phase ranges (in particular at low temperatures). To this end, a further increase in the available parameter latitude (clearing point, smectic-nematic transition or melting point, viscosity, dielectric parameters, elastic parameters) is urgently desired.

The invention has the object of providing media, in particular for MLC, TN or STN displays of this type, which do not have the abovementioned disadvantages or only do so to a reduced extent, and preferably simultaneously have very high specific resistance values and low threshold voltages. In particular, the compounds of the formula I enable the preparation of mixtures having a high clearing point and/or low viscosity (Δn value).

It has now been found that this object can be achieved if media according to the invention are used in displays.

The invention thus relates to a liquid-crystalline medium based on a mixture of polar compounds of positive dielectric anisotropy, characterized in that it comprises one or more compounds of general formula I

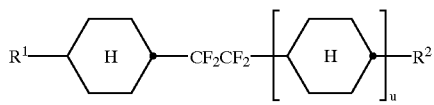

I in which
R$^1$ and R$^2$ are each, independently of one another, an alkyl or alkenyl radical having 1 to 12 carbon atoms which is unsubstituted, monosubstituted by CN or CF$_3$ or at least monosubstituted by halogen, where one or more CH$_2$ groups in these radicals may also, in each case independently of one another, be replaced by —O—, —S—,

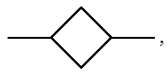

—CO—, —CO—O—, —O—CO— or —O—CO—O— in such a way that O atoms are not linked directly to one another, and
is 1 or 2.

The compounds of the formula I have a broad range of applications. Depending on the choice of substituents, these compounds can serve as base materials of which liquid-crystalline media are predominantly composed; however, it is also possible to add compounds of the formula I to liquid-crystalline base materials from other classes of compound in order, for example, to modify the dielectric and/or, in particular, the optical anisotropy of a dielectric of this type and/or to optimize its threshold voltage and/or its viscosity.

In the pure state, the compounds of the formula I are colourless and form liquid-crystalline mesophases in a temperature range which is favourably located for electro-optical use. They are stable chemically, thermally and to light.

The compounds of the formula I are covered by the general formula in DE 40 15 681 A1.

If R$^1$ and/or R$^2$ is an alkyl radical and/or an alkoxy radical, this can be straight-chain or branched. It is preferably straight-chain, has 2, 3, 4, 5, 6 or 7 carbon atoms and accordingly is preferably ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, methoxy, octoxy, nonoxy, decoxy, or undecoxy.

Oxaalkyl is preferably straight-chain 2-oxapropyl (=methoxymethyl), 2- (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If R$^1$ and/or R$^2$ is an alkyl radical in which one CH$_2$ group has been replaced by —CH=CH—, this can be straight-chain or branched. It is preferably straight-chain and has 2 to 10 carbon atoms. Accordingly, it is in particular vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, furthermore oct-1-, -2-, -3-, -4-, -5-, -6- or -7-enyl, non-1-, -2-, -3-, -4-, -5-, -6-, -7- or -8-enyl, or dec-1-, -2-, -3-, -4-, -5-, -6-, -7-, -8- or -9-enyl.

If R$^1$ and/or R$^2$ is an alkyl radical in which one CH$_2$ group has been replaced by —O— and one has been replaced by —CO—, these are preferably adjacent. These thus contain an acyloxy group —CO—O— or an oxycarbonyl group —O—CO—. These are preferably straight-chain and have 2 to 6 carbon atoms.

Accordingly, they are in particular acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If R$^1$ and/or R$^2$ is an alkyl radical in which one CH$_2$ group has been replaced by unsubstituted or substituted —CH=CH— and an adjacent CH$_2$ group has been replaced by CO or CO—O or O—CO, this can be straight-chain or branched. If is preferably straight-chain and has 4 to 13 carbon atoms. Accordingly, it is in particular acryloyloxymethyl, 2-acryloyloxyethyl, 3-acryloyloxypropyl, 4-acryloyloxybutyl, 5-acryloyloxpentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxpentyl, 6-methacryloyloxyhexyl 7-methacryloyloxyheptyl, 8-methacryloyloxyoctyl or 9-methacryloyloxynonyl.

If R$^1$ and/or R$^2$ is an alkyl or alkenyl radical which is monosubstituted by CN or CF$_3$, this radical is preferably straight-chain. The substitution by CN or CF$_3$ is in any desired position.

If R$^1$ and/or R$^2$ is an alkyl or alkenyl radical which is at least monosubstituted by halogen, this radical is preferably straight-chain and halogen is preferably F or Cl. In the case of polysubstitution, halogen is preferably F. The resultant radicals also include perfluorinated radicals. In the case of monosubstitution, the fluorine or chlorine substitutent can be in any desired position, but is preferably in the ω-position.

Compounds of the formula I which contain wing groups R$^1$ and/or R$^2$ which are suitable for polymerization reactions are suitable for the preparation of the liquid-crystalline polymers.

Compounds of the formula I containing branched wing groups R$^1$ and/or R$^2$ may occasionally be of importance owing to better solubility in the conventional liquid-crystalline base materials, but in particular as chiral dopants if they are optically active. Smectic compounds of this type are suitable as compounds of ferro-electric materials.

Compounds of the formula I having S$_A$ phases are suitable, for example, for thermally addressed displays.

Branched groups of this type generally contain not more than one chain branch. Preferred branched radicals R$^1$ and/or R$^2$ are isopropyl, 2-butyl (=1-methylpropyl), isobutyl (=2- methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy or 1-methylheptoxy.

If $R^1$ and/or $R^2$ is an alkyl radical in which two or more $CH_2$ groups have been replaced by —O— and/or —CO—O—, this can be straight-chain or branched. It is preferably branched and has 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl or 5,5-bis(ethoxycarbonyl)hexyl.

The compounds of the formula I are prepared by methods known per se, as described in the literature (for example in the standard works, such as Houben-Weyl, Methoden der organischen Chemie [Methods of Organic Chemistry], Georg-Thieme-verlag, Stuttgart, or in DE 40 15 681 A1, to be precise under reaction conditions which are known and suitable for said reactions. Use can also be made here of variants which are known per se, but are not mentioned here in greater detail.

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which comprise media of this type, and to the use of these media for electro-optical purposes.

The liquid-crystal mixtures according to the invention allow a significant increase in the parameter latitude which is available.

The achievable combinations of clearing point, viscosity at low temperature, thermal and UV stability and dielectric anisotropy are far superior to the known materials from the prior art.

The requirement for a high clearing point, nematic phase at low temperature and high $\Delta\epsilon$ has hitherto only been achieved inadequately. Although systems such as, for example, ZLI-3119 have a comparable clearing point and comparably favourable viscosities, they have, however, a $\Delta\epsilon$ of only +3.

Other mixture systems have comparable viscosities and $\Delta\epsilon$ values, but only have clearing points in the region of 60° C.

While retaining the nematic phase down to −20° C., preferably down to −30° C., particularly preferably down to −40° C., and clearing points above 80° C., preferably above 90° C., particularly preferably above 100° C., the liquid-crystal mixtures according to the invention enable dielectric anisotropy values $\Delta\epsilon$ of $\geq 6$, preferably $\geq 8$, and a high specific resistance value to be achieved simultaneously, allowing excellent STN and MLC displays, to be achieved. In particular, the mixtures are characterized by low operating voltages. The TN thresholds are below 2.0 V, preferably below 1.5 V, particularly preferably <1.3 V.

Using the compounds of formula I, it is also possible to produce low $\Delta n$ mixtures having $\Delta n$ values of <0.065, in particular of <0.061. The low $\Delta n$ mixtures are further characterized by their low rotational viscosity values $\gamma_1$ and have relatively high $\Delta\epsilon$ values.

It goes without saying that a suitable choice of the components of the mixtures according to the invention also allows higher clearing points (for example above 110°) to be achieved at the same time as a higher threshold voltage or lower clearing points to be achieved at the same time as lower threshold voltages while retaining the other advantageous properties. Likewise, mixtures of higher $\Delta\epsilon$ and thus lower thresholds can also be obtained at viscosities which are increased correspondingly little. The MLC displays according to the invention preferably operate at the first Gooch and Tarry transmission minimum [C. H. Gooch and H. A. Tarry, Electron. Lett. 10, 2–4, 1974; C. H. Gooch and H. A. Tarry, Appl. Phys., Vol. 8, 1575–1584, 1975], where, besides particularly favourable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. Thus, significantly higher specific resistance values can be achieved using the mixtures according to the invention at the first minimum than in the case of mixtures comprising cyano compounds. Through a suitable choice of the individual components and their proportions by weight, the person skilled in the art can set the birefringence necessary for a specified layer thickness of the MLC display using simple routine methods.

The flow viscosity $v_{20}$ at 20° C. is preferably <60 mm$^2$·s$^{-1}$, particularly preferably <50 mm$^2$·s$^{-1}$. The nematic phase range is preferably at least 90°, in particular at least 100°. This range preferably extends at least from −20° to +80°. The rotational viscosity $\gamma_1$ of the mixtures according to the invention at 20° C. is preferably <150 mPa·s, particularly preferably <120 mPa·s, for low $\Delta n$ mixtures. For high $\Delta n$ mixtures, the $\gamma_1$ values are preferably <320 mPa·s.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I have a significantly smaller drop in HR with increasing temperature than analogous mixtures in which the compounds of the formula I have been replaced by cyanophenylcyclohexanes of the formula

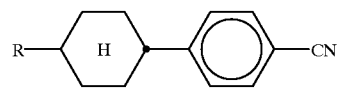

or esters of the formula

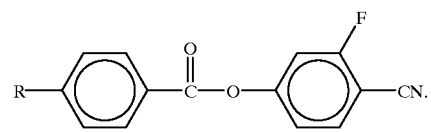

The UV stability of the mixtures according to the invention is also considerably better, i.e. they exhibit a significantly smaller drop in HR on UV exposure.

The media according to the invention are preferably based on a plurality (preferably two or more) or compounds of the formula I, i.e. the proportion of these compounds is 5–95%, preferably 10–60%, particularly preferably in the range 15–50%.

The individual compounds of the formulae I to XVIII and their sub-formulae which can be used in the media according to the invention are either known or can be prepared analogously to the known compounds.

Preferred embodiments are indicated below.

The medium comprises one or more compounds of the formula I1 to I5:

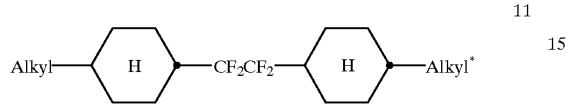

I1

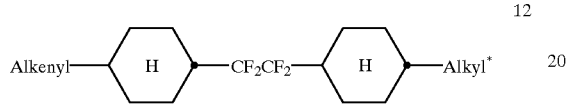

I2

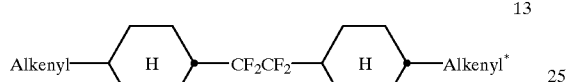

I3

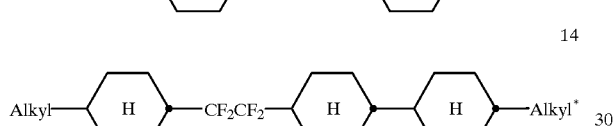

I4

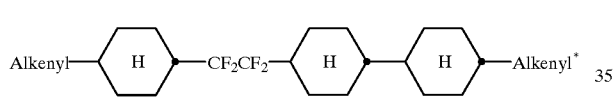

I5 in which
- Alkyl and Alkyl* are each, independently of one another, a straight-chain alkyl radical, having 1–8 carbon atoms in particular having 2–5 carbon atoms, and
- Alkenyl and Alkenyl* are each, independently of one another, a 1E- or 3E-alkenyl radical having 2 to 6 carbon atoms.

The medium additionally comprises one or more compounds selected from the group consisting of the general formulae II to VIII:

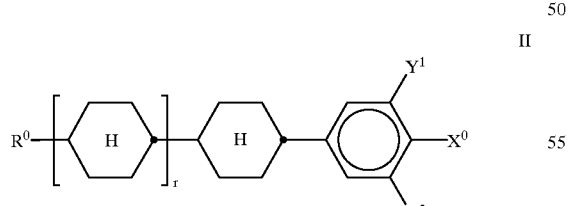

II

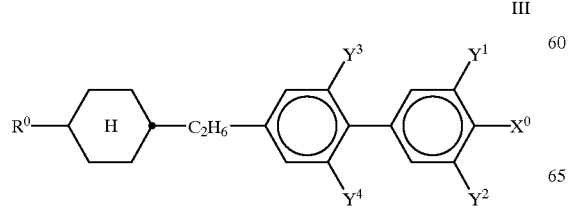

III

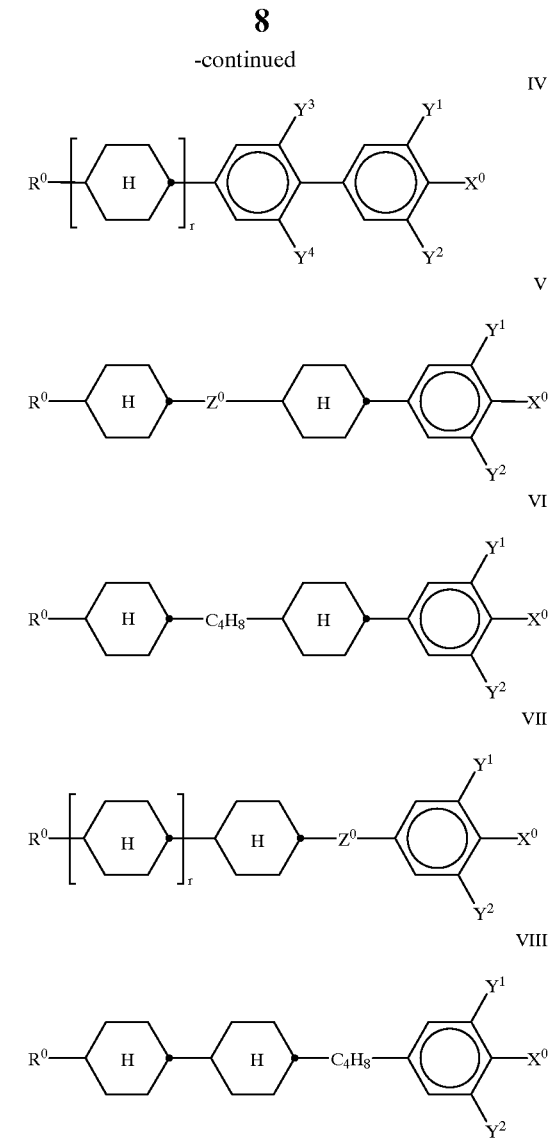

IV

V

VI

VII

VIII in which the individual radicals have the following meanings:

$R^0$: n-alkyl, oxaalkyl, fluoroalkyl or alkenyl, in each case having up to 9 carbon atoms $X^0$: F, Cl, halogenated alkyl, alkenyl or alkoxy having 1 to 6 carbon atoms $Z^0$: —$C_2H_4$—, —$CH_2O$—, —$OCF_2$—, —$CF_2O$— or —$C_2F_4$—, $Y^1$, $Y^2$, $Y^3$ and $Y^4$: each, independently of one another, H or F;

r: 0 or 1.

The compound of the formula IV is preferably

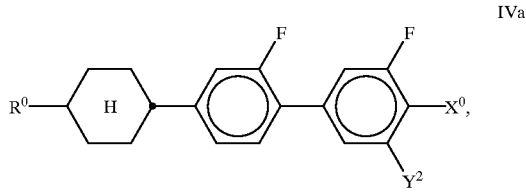

IVa

IVb
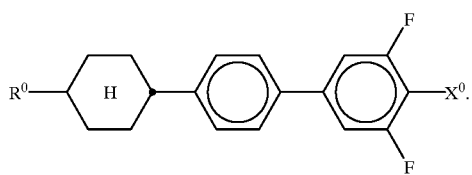

IVc
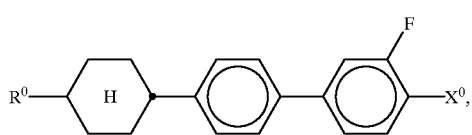

IVd
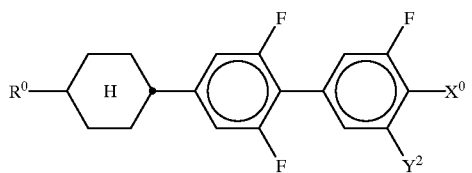

IVe
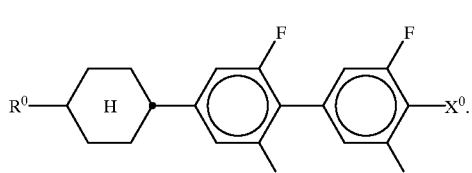

The medium additionally comprises one or more compounds selected from the group consisting of the compounds of the general formulae IX and XVIII:

IX

X

XI

XII

XIII

XIV

XV

XVI

XVII

XVIII

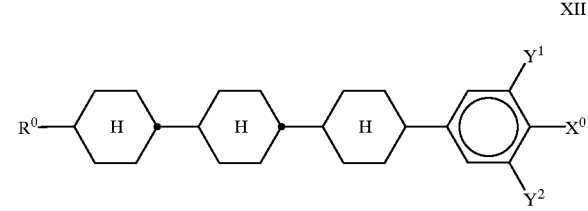
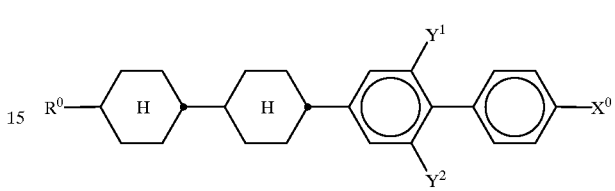
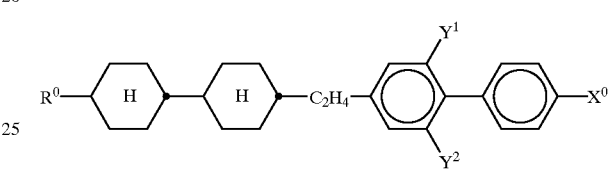
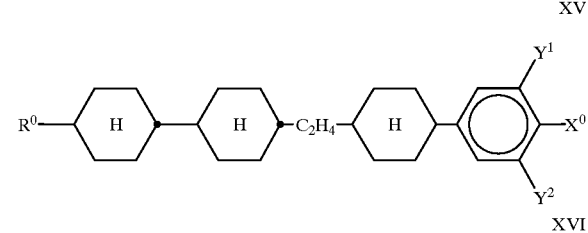
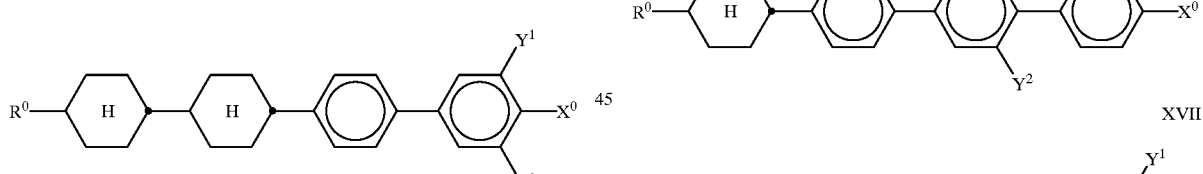
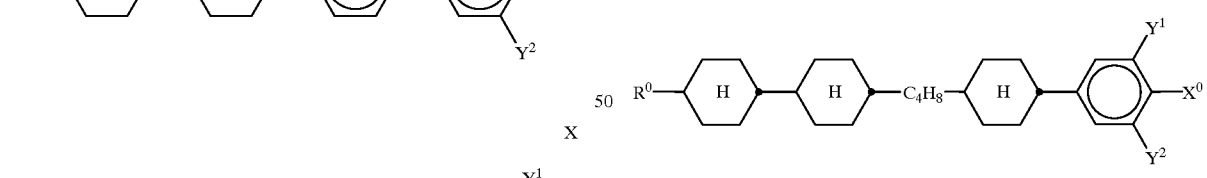
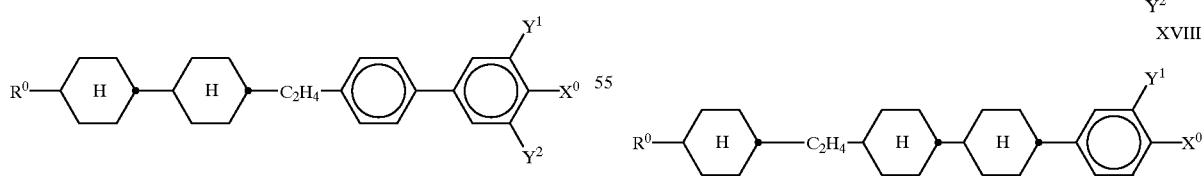
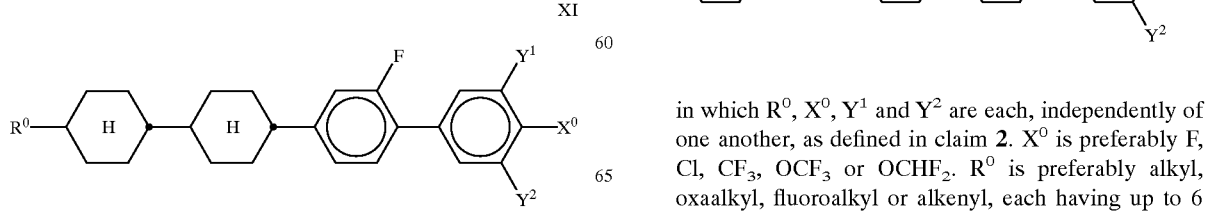

in which $R^0$, $X^0$, $Y^1$ and $Y^2$ are each, independently of one another, as defined in claim 2. $X^0$ is preferably F, Cl, $CF_3$, $OCF_3$ or $OCHF_2$. $R^0$ is preferably alkyl, oxaalkyl, fluoroalkyl or alkenyl, each having up to 6 carbon atoms.

The proportion of compounds of the formulae I to VIII in the mixture as a whole is at least 30% by weight, preferably at least 50% by weight;

The proportion of compounds of the formula I in the mixture as a whole is from 1 to 50% by weight, preferably 2–30% by weight, in particular 5–25% by weight;

The proportion of compounds of the formula II to VIII in the mixture as a whole is from 20 to 80% by weight;

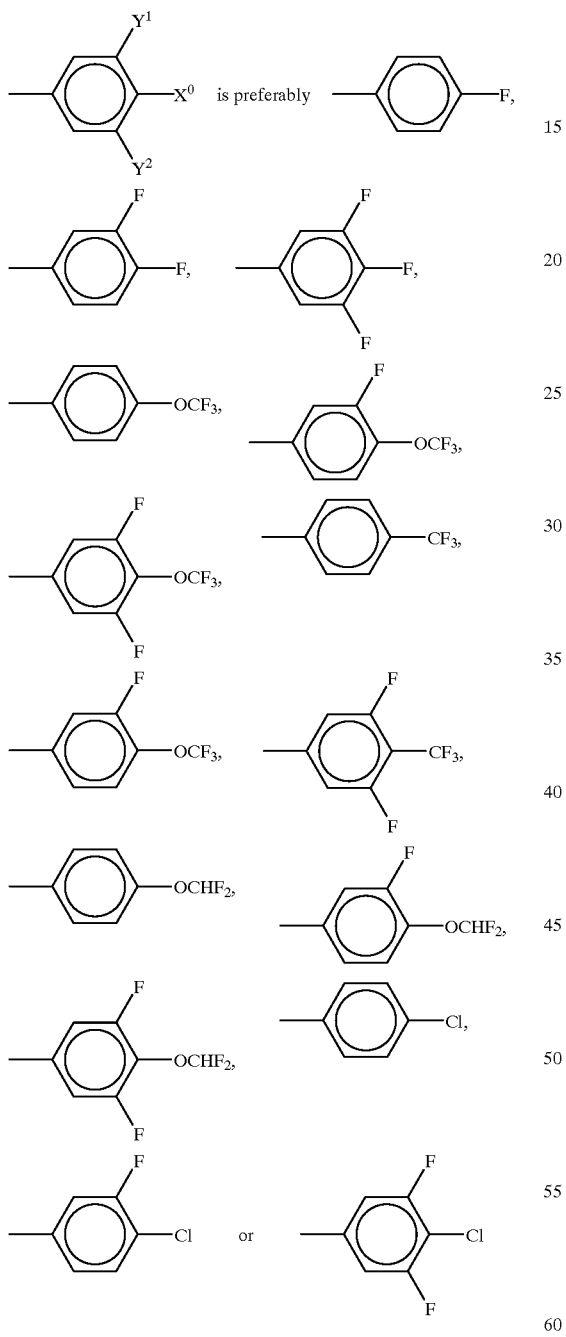

The medium comprises one or more compounds of the formulae II, III, IV, V, VI, VII and/or VIII;

$R^0$ is straight-chain alkyl or alkenyl having 2 to 7 carbon atoms;

The medium essentially consists of compounds of the formulae I to VIII;

The medium preferably comprises one, two or three compounds of the formula I;

The medium comprises a mixture of compounds of the formula I in which $R^1$ and/or $R^2$ is methyl, ethyl, n-$C_3H_7$, n-$C_4H_9$, n-$C_5H_{11}$ or n-$C_6H_{11}$;

The medium comprises further compounds, preferably selected from the following group consisting of the general formulae XIX to XXII;

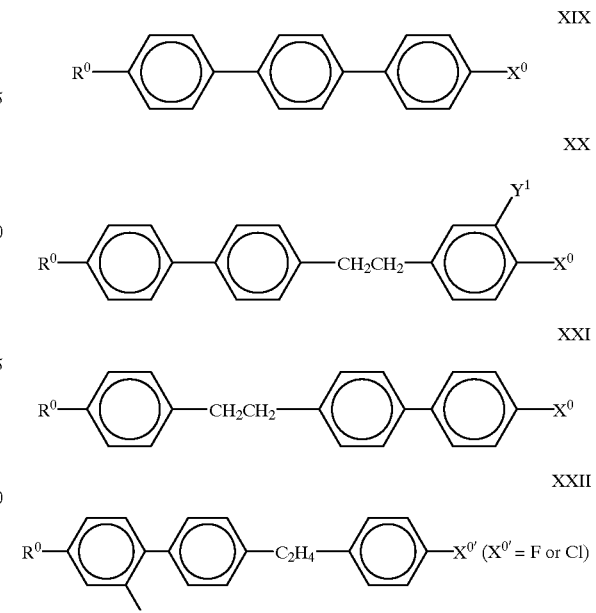

in which $R^0$ and $X^0$ are as defined above, and the 1,4-phenylene rings may be substituted by methyl, CN, chlorine or fluorine. The 1,4-phenylene rings are preferably mono- or polysubstituted by fluorine atoms.

The medium preferably comprises bicyclic carbocyclic compounds of the formula XXIII

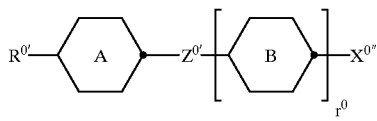

in which

and

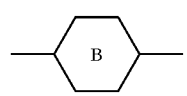

are each, independently of one another,

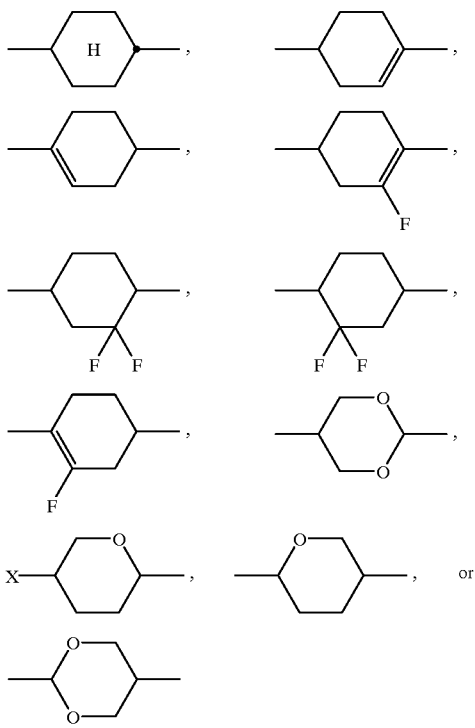

$Z^0$ is a single bond, —$C_2H_4$—, —$C_4H_8$—, —COO—, —O—CO—, —$CF_2O$— or —$OCF_2$—, $r^0$ is 1 or 2, $R^{0'}$ is as defined for $R^0$, and $X^{0''}$ is $OCF_3$, F, Cl, $CF_3$, alkyl or alkoxy.

Preferred sub-formulae of the formula XXIII are

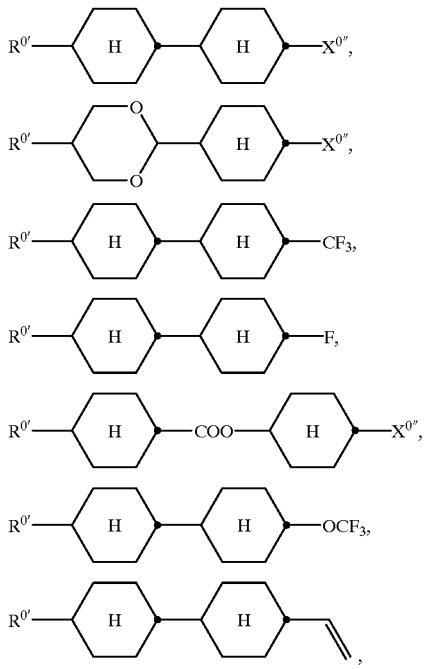

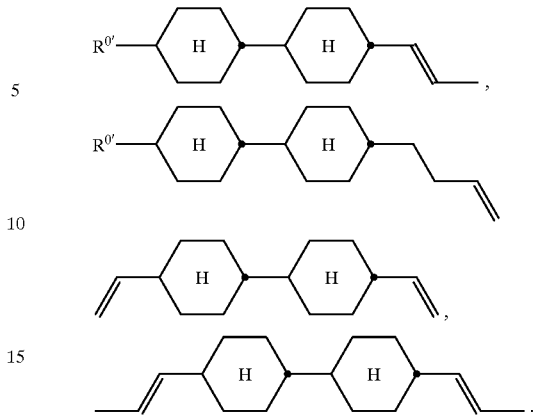

Very particularly preferred sub-formulae of the formula XXIII are

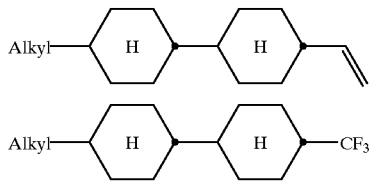

in which
Alkyl is a straight-chain alkyl radical having 1–8 carbon atoms, in particular 2–5 carbon atoms.

The I: (II+III+IV+VI+VII+VIII) weight ratio is preferably 1 : 10 to 10 : 1;

The medium essentially consists of compounds selected from the group consisting of the general formulae I to XVII.

The term "alkyl" or "alkyl*" preferably covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" or "alkenyl*" preferably covers straight-chain and branched alkenyl groups having 2–7 carbon atoms, in particular the straight-chain groups. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a termina florine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$-O-$(CH_2)$m, in which n and m are each, independently of one another, from 1 to 6. n is preferably 1 and m is preferably from 1 to 6.

It has been found that even a relatively small proportion of compounds of the formula I mixed with conventional liquid-crystal materials, but in particular with one or more compounds of the formulae II, III, IV, V, VI, VIII and/or VIII results in a significant reduction in the threshold voltage and in low birefringence values, where broad nematic phases with low smectic-nematic transition temperatures are simultaneously observed, improving the storage stability. Particular preference is given to mixtures which, in addition to one or more compounds of the formula I, comprise one or more compounds of the formula IV, in particular compounds of the formula IVa and/or IVd in which $X^0$ is F, $OCHF_2$ or $OCF_3$. The compounds of the formulae I to VIII are colourless, stable and readily miscible with one another and with other liquid-crystalline materials. The mixtures according to the invention are furthermore distinguished by very high clearing points, the values for the rotational viscosity $\gamma_1$ being comparatively low.

Through suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in short addressing times, improved nematic tendencies and a higher ratio of the elastic constants $k_{33}$ (bend) and $k_{11}$ (splay) compared with alkyl or alkoxy radicals. 4-Alkenyl radicals, 3-alkenyl radicals and the like generally give lower threshold voltages and smaller values of $k_{33}/k_{11}$ compared with alkyl and alkoxy radicals.

A —$CH_2CH_2$— group generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (higher multiplexability), and vice versa.

The optimum mixing ratio of the compounds of the formulae I and II+III+IV+V+VI+VII+VIII depends substantially on the desired properties, on the choice of the components of the formulae I, II, III, IV, V, VI, VII and/or VIII, and on the choice of any other components which may be present. Suitable mixing ratios within the range given above can easily be determined from case to case.

The total amount of compounds of the formulae I to XVIII in the mixtures according to the invention is not crucial. The mixtures can therefore comprise one or more further components in order to optimize various properties. However, the observed effect on the addressing times and the threshold voltage is generally greater the higher the total concentration of compounds of the formulae I to XVIII.

In a particularly preferred embodiment, the media according to the invention comprise compounds of the formulae II to VIII (preferably II, III and/or IV, in particular IVa) in which $X^0$ is F, $OCF_3$, $OCHF_2$, $OCH=CF_2$, $OCF=CF_2$ or $OCF_2$-$CF_2H$. A favourable synergistic effect with the compounds of the formulae I results in particularly advantageous properties. In particular, mixtures comprising compounds of the formulae I and the formula IVa are distinguished by their low threshold voltages.

The construction of the MLC display according to the invention from polarizers, electrode base plates and surface-treated electrodes corresponds to the conventional construction for displays of this type. The term "conventional construction" is broadly drawn here and also covers all derivatives and modifications of the MLC display, in particular including matrix display elements based on poly-Si TFT or MIM.

A significant difference between the displays according to the invention and the conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in a lesser amount is dissolved in the components making up the principal constituent, expediently at elevated temperature. It is also possible to mix solutions of the components in an organic solvent, for example in acetone, chloroform or methanol, and to remove the solvent again after thorough mixing, for example by distillation.

The dielectrics may also comprise further additives known to the person skilled in the art and described in the literature. For example, 0–15% of pleochroic dyes and/or chiral dopants can be added.

C denotes a crystalline phase, S a smectic phase, $S_c$ a smectic C phase, N a nematic phase and I the isotropic phase.

$V_{10}$ denotes the voltage for 10% transmission (viewing direction perpendicular to the plate surface). $t_{on}$ denotes the switch-on time and $t_{off}$ the switch-off time at an operating voltage corresponding to 2.5 times the value of $V_{10}$. $\Delta n$ denotes the optical aniscropy, and $n_o$ the refractive index. $\Delta\epsilon$ denotes the dielectric anisotropy ($\Delta\epsilon=\epsilon_{\parallel}-\epsilon_{\perp}$, where $\epsilon_{\parallel}$ denotes the dielectric constant parallel to the longitudinal axis of the molecules, and $\epsilon_{\perp}$ denotes the dielectric constant perpendicular thereto). The electro-optical data were measured in a TN cell at the 1st minimum (i.e. at a d·$\Delta n$ value of 0.5) at 20° C., unless expressly stated otherwise. The optical data were measured at 20° C., unless expressly stated otherwise.

In the present application and in the example below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively; n and m are preferably 0, 1, 2, 3, 4, 5, 6 and 7. The coding in Table B is self-evident. In Table A, only the acronym for the parent structure is given, followed, separated from the acronym for the parent structure by a hyphen, by a code for the substitutes $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nCFhd 3 | $C_nH_{2n+1}$ | $CF_3$ | H | H |
| nOCF$_3$ | $C_nH_{2n+1}$ | $OCF_3$ | H | H |
| nOCF$_2$ | $C_nH_{2n+1}$ | $OCHF_2$ | H | H |
| nS | $C_nH_{2n+1}$ | NOS | H | H |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | $COOC_mH_{2m+1}$ | H | H |
| nOCCF$_2$.F.F | $C_nH_{2n+1}$ | $OCH_2CF_2H$ | F | F |

Preferred mixture components of the mixture concept according to the invention are shown in Tables A and B.

TABLE A
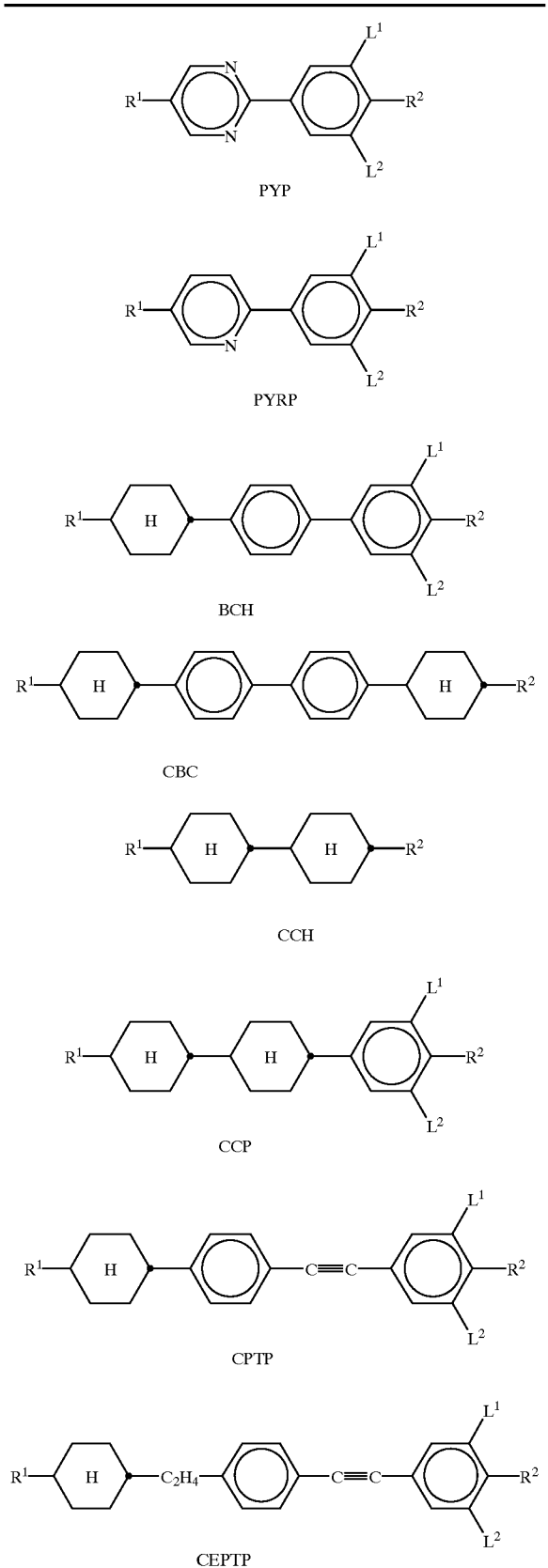
TABLE A-continued
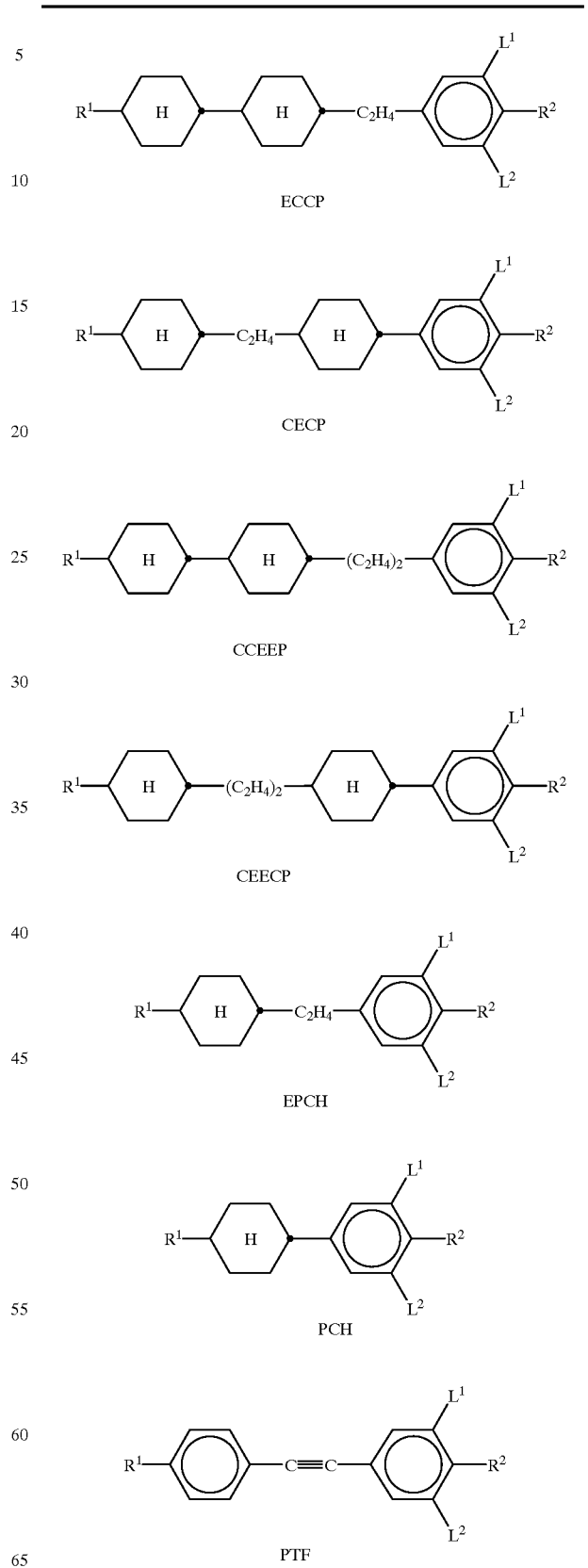

TABLE A-continued
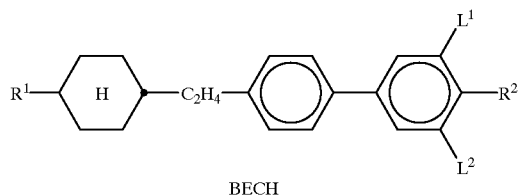
BECH
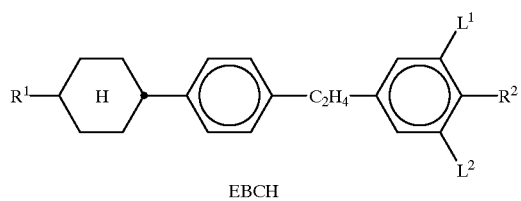
EBCH
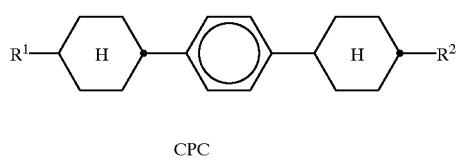
CPC
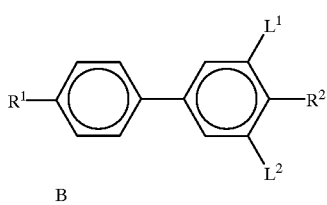
B
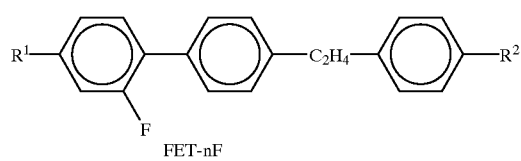
FET-nF
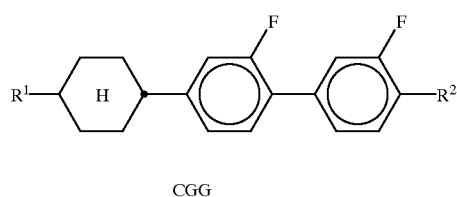
CGG
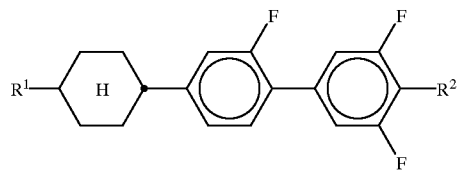
CGU
TABLE A-continued
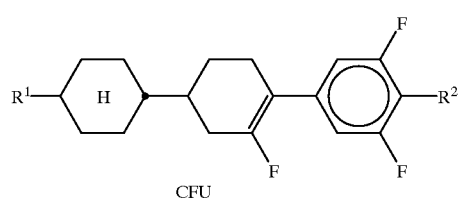
CFU
TABLE B
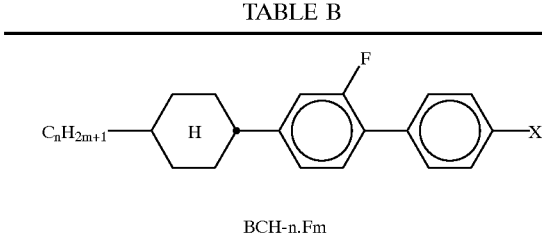
BCH-n.Fm
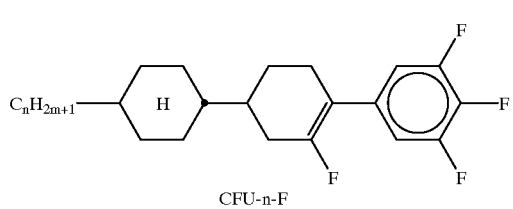
CFU-n-F
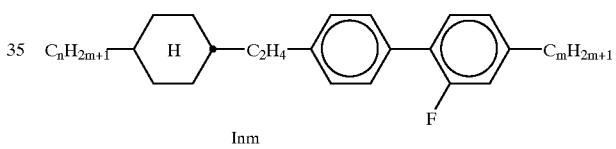
Inm
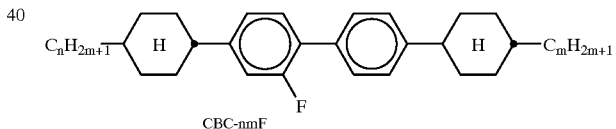
CBC-nmF
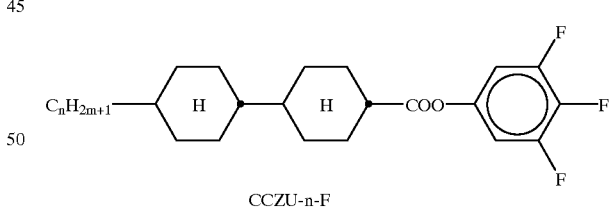
CCZU-n-F
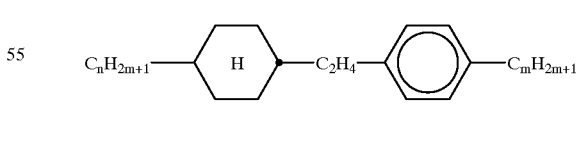
ECCP-nm
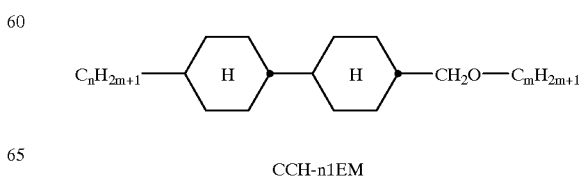
CCH-n1EM TABLE B-continued
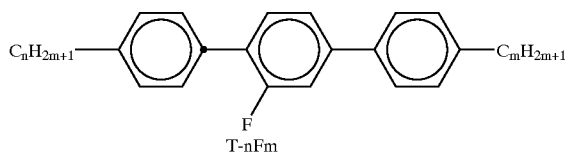
T-nFm
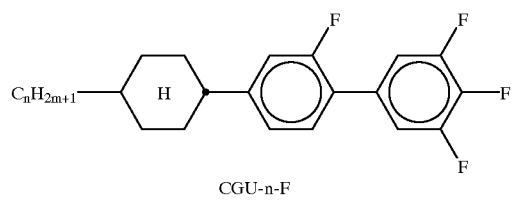
CGU-n-F
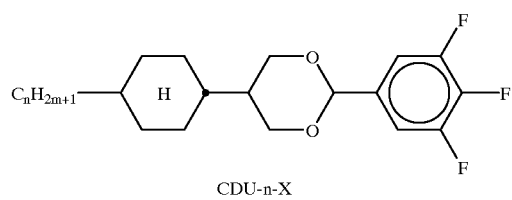
CDU-n-X
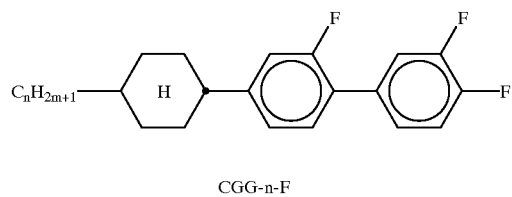
CGG-n-F
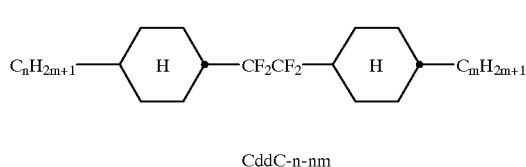
CddC-n-nm
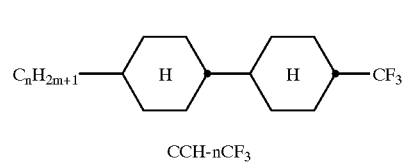
CCH-nCF3
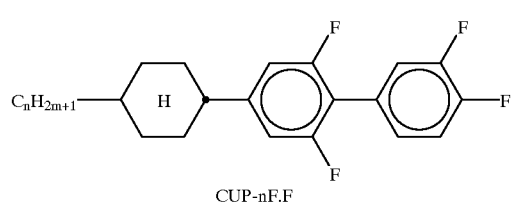
CUP-nF.F
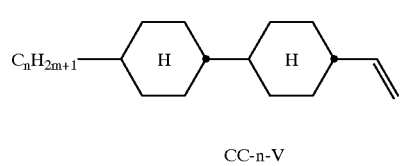
CC-n-V
TABLE B-continued
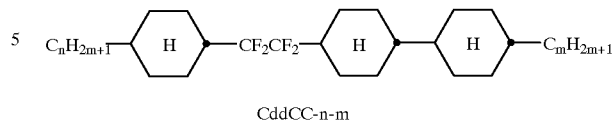
CddCC-n-m
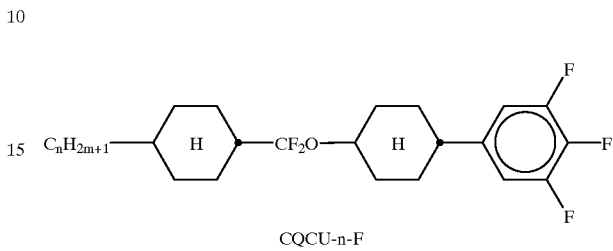
CQCU-n-F
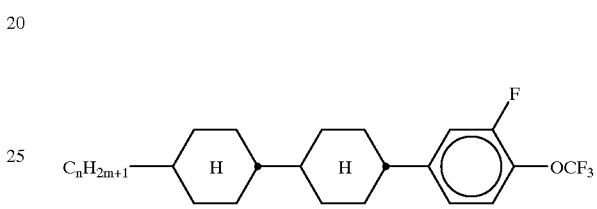
CCG-n-OT
CCU-n-OT
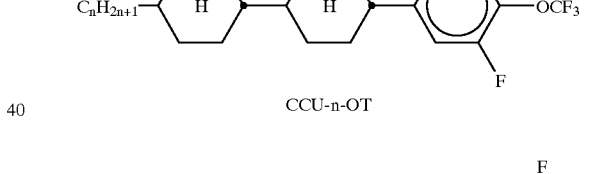
CCQG-n-OT
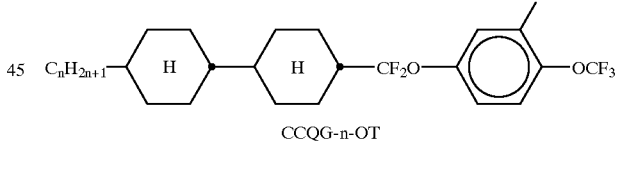
Dec-U-n-F
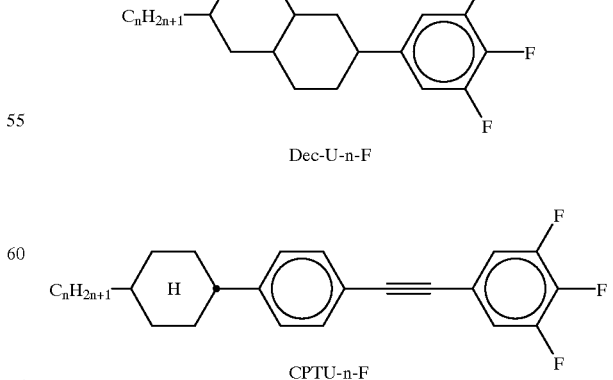
CPTU-n-F

TABLE B-continued

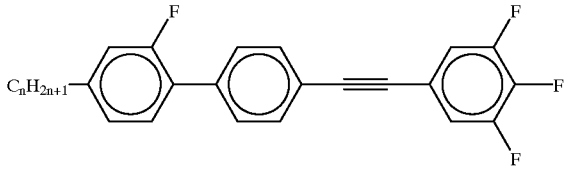

GPTU-n-F

In addition to one or more compounds of the formula I, one, two, three, four, five or more compounds from Table B.

The examples below are intended to illustrate the invention without representing a limitation. Above and below, percentages are percent by weight. All temperatures are given in degrees Celsius. m.p. denotes melting point, cl.p.= clearing point. Furthermore, C=crystalline state, N=nematic phase, S=smectic phase and I=isotropich phase. The numbers between these symbols are the transition temperatures. $\Delta n$ denotes the optical anisotropy (589 nm, 20° C.). The flow viscosity $\nu_{20}$ (mm$^2 \cdot$s$^{-1}$) and the rotational visocity $\gamma\tau$ (mPa·s) were determined at 20° C.

MIXTURE EXAMPLES

Example A (for high $T_{clp}$)

| | | | |
|---|---|---|---|
| PCH-5F | 3.20% | Clearinq point: | 127.6° C. |
| CCP-2OCF$_2$.F.F | 17.04% | $\Delta n$ [589 nm, 20° C.]: | 0.089 |
| CCP-3OCF$_2$.F.F | 16.00% | $\Delta\epsilon$ [1 kHz, 20° C.] | +6.3 |
| CCP-5OCF$_2$.F.F | 17.04% | $\gamma_1$ [mPa.s, 20° C.] | 306 |
| CUP-2F.F | 5.36% | | |
| CUP-3F.F | 5.36% | | |
| CBC-33F | 5.36% | | |
| CBC-53F | 5.36% | | |
| CBC-55F | 5.28% | | |
| CddC-5-5 | 20.00% | | |

Example B (for low $\Delta n$)

| | | | |
|---|---|---|---|
| CCH-3CF$_3$ | 4.0% | Clearing point: | 69.4° C. |
| CCH-5CF$_3$ | 10.0% | $\Delta n$ [589 nm, 20° C.]: | 0.058 |
| CddC-3-3 | 10.00% | $\Delta\epsilon$ [1 kHz, 20° C.] | +7.0 |
| CCH-34 | 5.0% | $\gamma_1$ [mPa.s, 20° C.] | 106.8 |
| CC-5-V | 4.0% | | |
| CCP-2F.F.F | 12.0% | | |
| CCP-3F.F.F | 11.0% | | |
| CCP-5F.F.F | 6.0% | | |
| CCP-2OCF$_3$.F. | 12.0% | | |
| CCZU-2-F | 5.0% | | |
| CCZU-3-F | 16.0% | | |
| CCZU-5-F | 5.0% | | |

Example C (for low $\Delta n$)

| | | | |
|---|---|---|---|
| CCH-5CF3 | 10.0% | Clearing point: | 70.5° C. |
| CCH-34 | 5.0% | $\Delta n$ ]589 nm, 20° C.]: | 0.059 |
| CC-5-V | 16.0% | $\Delta\epsilon$ [1 kHz, 20° C.] | +6.8 |
| CCP-2F.F.F | 12.0 | $\gamma_1$ [mPa.s, 20° C.] | 105 |
| CCP-3F.F.F | 10.0% | | |
| CCP-5F.F.F | 7.0% | | |
| CCP-2OCF$_3$.F. | 12.0% | | |
| CCZU-2-F | 5.0% | | |
| CCZU-3-F | 16.0% | | |
| CCZU-5-F | 5.0% | | |
| CddCC-5-3 | 2.0% | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosure of all applications, patents and publications, cited above, are hereby incorporated by reference.

This application claims priority under 35 USC Section 119 to German Patent Application 19859419.4, filed Dec. 22, 1998, and German Patent Application 19910435.2, filed Mar. 10, 1999, which applications are expressly incorporated herein by reference.

Not intending to be limited by the specific examples and preferred embodiments discussed hereinbefore, but only by the claims which follow, the applicants claim:

What is claimed is:

1. A liquid-crystalline medium having a mixture of polar compounds of positive dielectric anisotropy, comprising one or more compounds of the formula I:

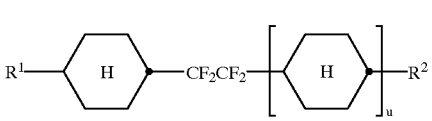

wherein

R$^1$ and R$^2$ are each, independently of one another, an alkyl or alkenyl radical having 1 to 12 carbon atoms which is unsubstituted, monosubstituted by CN or CF$_3$ or at least monosubstituted by halogen, where one or more CH$_2$ groups in these radicals may also, in each case independly of one another, be replaced by —O—, —S—,

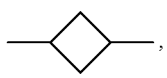

—CO—, —CO—O, —O—CO— or —O—CO—O— in such a way that O atoms are not linked directly to one another, and u is 1 or 2; and one or more compounds of the formulae II, III, V, VI, VII or VIII;

II

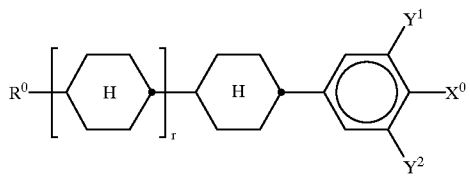

III

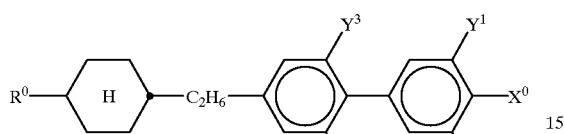

IV

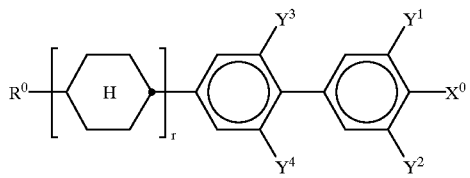

V

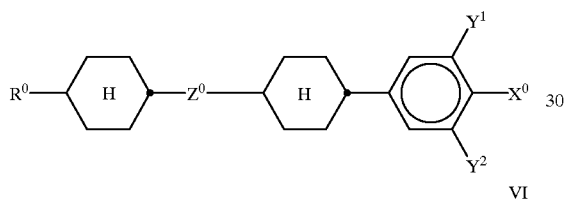

VI

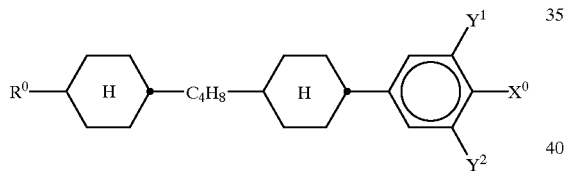

VII

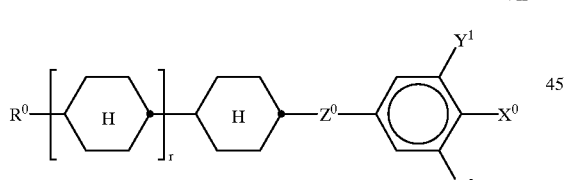

VIII

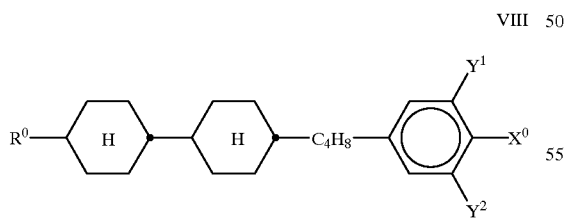

wherein the individual radicals have the following meanings:

$R^0$: n-alkyl, oxaalkyl, fluoroalkyl or alkenyl, in each case having up to 9 carbon atoms;

$X^0$: F, Cl, halogentated alkyl, alkenyl or alkoxy having 1 to 6 carbon atoms;

$Z^0$: —$C_2H_4$—, —$CH_2$—O—, —$OCH_2$—, —$CF_2O$— or —$C_2F_4$—, $Y^1$ and $Y^2$: each, independently of one another, H or F; and r: 0 or 1.

2. A medium according to claim 1, wherein the proportion of the compound of at least one of the formulae I to VIII in the mixture as a whole is at least 30% by weight.

3. A medium according to claim 1, wherein the proportion of the compound of the formula I in the mixture as a whole is from 1 to 50% by weight.

4. A medium according to claim 1, wherein the proportion of the compound of at least one of the formulae II to VIII in the mixture as a whole is from 20 to 80% by weight.

5. A medium comprising:
one or more compounds of the formula I:

I

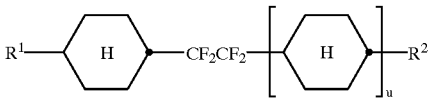

wherein
$R^1$ and $R^2$ are each, independently of one another, an alkyl or alkenyl radical having 1 to 12 carbon atoms which is unsubstituted, monosubstituted by CN or $CF_3$ or at least monosubstituted by halogen, where one or more $CH_2$ groups in these radicals may also, in each case independently of one another, be replaced by —O—, —S—,

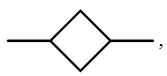

—CO—, —CO—O—, —O—CO— or —O—CO—O in such a way that O atoms are not linked directly to one another and,
u is 1 or 2; and
one or more compounds of the formula IVa and/or IVd:

IVa

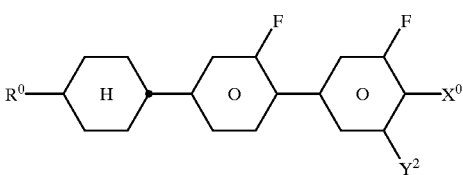

IVd

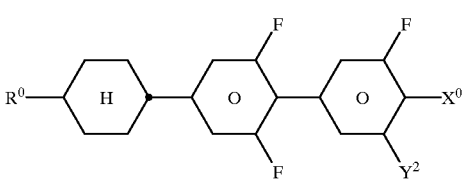

wherein $R^0$, $X^0$ and $Y^2$ are defined as:
$R^0$: n-alkyl, oxaalkyl, fluoroalkyl or alkenyl, in each case having up to 9 carbon atoms;
$X^0$: F, Cl, halogenated alkyl, alkenyl or alkoxy having 1 to 6 carbon atoms; and
$Y^2$: H or F.

6. A medium according to claim 5, wherein $X^0$ is F, $OCHF_2$ or $OCF_3$, and $Y^2$ is H or F.

7. A medium according to claim 1, wherein $R^1$ and $R^2$ in the compound of the formula I are each, independently of one another, straight-chain alkyl.

8. An electro-optical device comprising a liquid-crystalline medium according to claim 1.

9. An electro-optical liquid-crystal display comprising a liquid-crystalline medium according to claim 1.

10. A medium according to claim 1, wherein the mixture has a Δn value of <0.061.

11. A medium according to claim 1, wherein the mixture has a Δn value of <0.06.

12. A medium according to claim 1, comprising:
one or more compounds of the formula IVa and/or IVd:

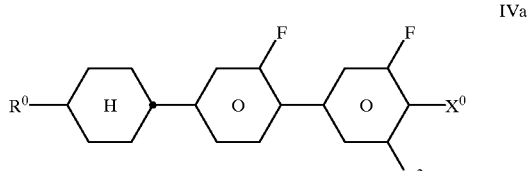

IVa

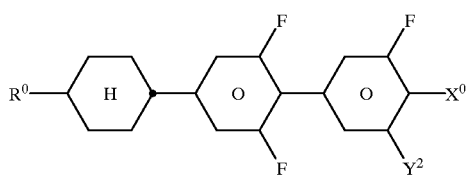

IVd where $R^0$, $X^0$ and $Y^2$ are defined as:
$R^0$: N-alkyl, oxaalkyl, fluoroalkyl or alkenyl, in each case having up to 9 carbon atoms;
$X^0$: F, Cl, halogenated alkyl, alkenyl or alkoxy having 1 to 6 carbon atoms; and
$Y^2$: H or F.

13. A medium according to claim 12, wherein $X^0$ is F, $OCHF_2$ or $OCF_3$, and $Y^2$ is H or F.

14. A medium according to claim 1, wherein the compound of formula I has a Δn value of <0.06.

15. A medium according to claim 1, wherein the mixture has a clearing point above 100° C.

16. A medium according to claim 1, wherein the compound of the formula I has a clearing point above 100° C.

17. A medium according to claim 1, wherein $R^1$ and $R^2$ of the compound of the formula I are independently, ethyl, propyl, butyl, pentyl, hexyl, heptyl, ethoxy, propoxy, butoxy, pentoxy, hexoxy, methyl, octyl, nonyl, decyl, undecyl, dodecyl, methoxy, octoxy, decoxy, or undecoxy.

18. A medium according to claim 1, wherein $R^1$ and $R^2$ of the compound of the formula I are, independently, acetoxy, propionyloxy, butyryloxy, pentanoyloxy, hexanolyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, mexthoxycarbonyl, ethoxycarbonylmethyl, propoxycarbonylmethyl, butoxycarbonylmethyl, 2-(methoxycarbonyl)ethyl, 2(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

19. A medium according to claim 1, wherein the mixture has a dielectric anisotropy values Δε of ≧6.

20. A medium according to claim 1, wheren the mixture has a dielectric anisotrophy values Δε of ≧8.

* * * * *

UNITED STATES PATENT AND TRADEMARK OFFICE
CERTIFICATE OF CORRECTION

PATENT NO. : 6,287,648 B1
DATED : September 11, 2001
INVENTOR(S) : Kazuaki Tarumi et al.

It is certified that error appears in the above-identified patent and that said Letters Patent is hereby corrected as shown below:

Title page,
Item [73], Assignee: "Mit, (DE)" should read -- mit Beschrankter Haftung, Darmstadt (DE) --.

Column 24,
Line 55, "independly" should read -- independently --.
Line 63, "–CO–O," should read -- –CO–O–, --.
Line 66, "formulae II, III, V," should read -- formulae II, III, IV, V, --.

Column 25,
Line 12, formula III should read

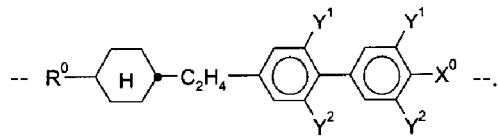

Line 18, formula IV should read

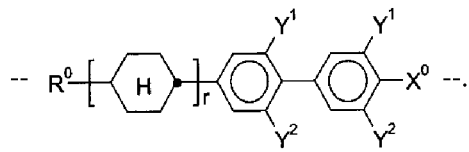

Line 30, formula V should read

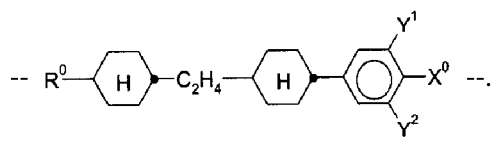

Line 46, formula VII should read

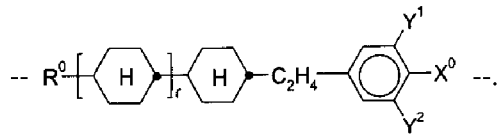

Line 64, "halogentated" should read -- halogenated --.
Line 66, "–CH$_2$–O–," should read -- –CH$_2$O–, --.
Line 66, "–OCH$_2$–, –CF$_2$O–" should read -- –OCH$_2$–, –OCF$_2$–, –CF$_2$O– --.

UNITED STATES PATENT AND TRADEMARK OFFICE
CERTIFICATE OF CORRECTION

PATENT NO.   : 6,287,648 B1
DATED        : September 11, 2001
INVENTOR(S)  : Kazuaki Tarumi et al.

It is certified that error appears in the above-identified patent and that said Letters Patent is hereby corrected as shown below:

Column 26,
Line 35, "–O–CO–O in" should read -- –O–CO–O– in --.
Lines 45-50, formulas IVa and IVd should read

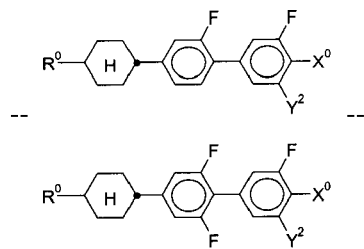

--

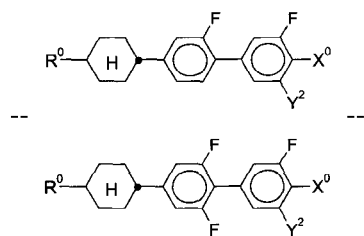

Column 27,
Lines 12-26, formulas IVa and IVd should read

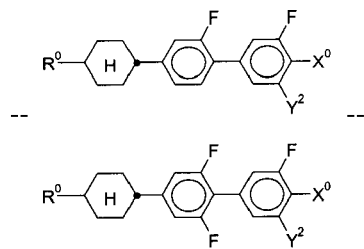

--

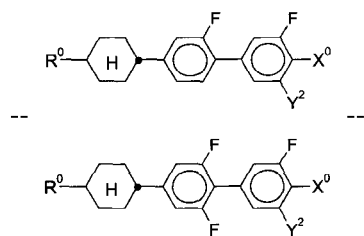

Line 28, "where $R^0$," should read -- wherein $R^0$, --.
Line 29, "$R^0$: N-alkyl," should read -- $R^0$: n-alkyl, --.

Column 28,
Line 10, "formula 1 are independently," should read -- formula 1 are, independently, --.
Line 12, "hexoxy, methyl," should read -- hexoxy, heptoxy, methyl, --.
Line 13, "octoxy, decoxy," should read -- octoxy, nonoxy, decoxy, --.
Line 17, "hexanolyloxy," should read -- hexanoyloxy, --.
Line 23, "mexthoxycarbonyl," should read -- methoxycarbonylmethyl, --.
Line 25, "2(ethoxycarbonyl)ethyl," should read -- 2-(ethoxycarbonyl)ethyl, --.
Line 29, "anisotropy values" should read -- anisotropy value --.
Line 30, "wheren the mixture" should read -- wherein the mixture --.
Line 31, "anisotrophy" should read -- anisotropy --.

UNITED STATES PATENT AND TRADEMARK OFFICE
CERTIFICATE OF CORRECTION

PATENT NO.    : 6,287,648 B1
DATED         : September 11, 2001
INVENTOR(S)   : Kazuaki Tarumi et al.

It is certified that error appears in the above-identified patent and that said Letters Patent is hereby corrected as shown below:

Column 38 (cont'd),
Line 31, "values" should read -- value --.

Signed and Sealed this

Twenty-first Day of June, 2005

JON W. DUDAS
*Director of the United States Patent and Trademark Office*